(12) United States Patent
Propheter-Hinckley et al.

(10) Patent No.: US 11,248,470 B2
(45) Date of Patent: Feb. 15, 2022

(54) AIRFOIL WITH CORE CAVITY THAT EXTENDS INTO PLATFORM SHELF

(71) Applicant: United Technologies Corporation, Farmington, CT (US)

(72) Inventors: Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 74 days.

(21) Appl. No.: 16/594,402

(22) Filed: Oct. 7, 2019

(65) Prior Publication Data

US 2020/0332660 A1 Oct. 22, 2020

Related U.S. Application Data

(60) Provisional application No. 62/757,914, filed on Nov. 9, 2018.

(51) Int. Cl.
*F01D 5/18* (2006.01)
*F01D 5/20* (2006.01)

(52) U.S. Cl.
CPC .......... *F01D 5/18* (2013.01); *F01D 5/20* (2013.01)

(58) Field of Classification Search
CPC ................................ F01D 5/18; F05D 2240/81
See application file for complete search history.

(56) References Cited

U.S. PATENT DOCUMENTS 4,946,346 A * 8/1990 Ito ...................... F01D 5/189
                                                    415/115
5,344,283 A * 9/1994 Magowan ............ F01D 5/187
                                                    415/115

(Continued)

FOREIGN PATENT DOCUMENTS

EP 1146201 10/2001
EP 1484476 12/2004

(Continued)

OTHER PUBLICATIONS

European Search Report for European Patent Application No. 192080653.3 completed Feb. 4, 2020.

*Primary Examiner* — Eldon T Brockman
(74) *Attorney, Agent, or Firm* — Carlson, Gaskey & Olds, P.C.

(57) ABSTRACT

An airfoil includes an airfoil section that has an airfoil wall that define leading and trailing ends and first and second sides that join the leading and trailing ends. The first and second sides span in a longitudinal direction between first and second ends. The airfoil wall circumscribes an internal core cavity. The airfoil section extends form a platform. The platform defines a shelf that extends forward from the first end at the leading end of the airfoil section to a platform leading edge, aft from the first end at the trailing end of the airfoil section to a platform trailing edge, laterally from the first end at the first side of the airfoil section to a first platform side edge, and laterally from the first end at the second side of the airfoil section to a second platform side edge. The internal core cavity extends from the airfoil section into the shelf.

13 Claims, 6 Drawing Sheets

(56) References Cited

U.S. PATENT DOCUMENTS

| | | | |
|---|---|---|---|
| 6,418,618 B1 * | 7/2002 | Burdgick | F01D 5/288 |
| | | | 29/889 |
| 7,121,793 B2 | 10/2006 | Correia | |
| 7,524,163 B2 | 4/2009 | Self et al. | |
| 8,360,716 B2 | 1/2013 | Bergman et al. | |
| 8,734,108 B1 * | 5/2014 | Liang | F01D 5/189 |
| | | | 416/97 R |
| 9,638,045 B2 * | 5/2017 | Weber | F01D 5/18 |
| 10,024,172 B2 | 7/2018 | Boeke et al. | |
| 10,041,374 B2 * | 8/2018 | Spangler | F01D 25/24 |
| 2015/0285097 A1 * | 10/2015 | Spangler | B22C 9/103 |
| | | | 415/116 |
| 2015/0345300 A1 * | 12/2015 | Weber | F01D 5/189 |
| | | | 416/96 R |

FOREIGN PATENT DOCUMENTS

| | | |
|---|---|---|
| EP | 3112592 | 1/2017 |
| GB | 2210415 | 6/1989 |

* cited by examiner

US 11,248,470 B2

AIRFOIL WITH CORE CAVITY THAT EXTENDS INTO PLATFORM SHELF

CROSS-REFERENCE TO RELATED APPLICATION

This application claims priority to U.S. Patent Application No. 62/757,914 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section having an airfoil wall defining leading and trailing ends and first and second sides joining the leading and trailing ends. The first and second sides span in a longitudinal direction between first and second ends. The airfoil wall circumscribes an internal core cavity. A platform from which the airfoil section extends defines a shelf that extends forward from the first end at the leading end of the airfoil section to a platform leading edge, aft from the first end at the trailing end of the airfoil section to a platform trailing edge, and laterally from the first end at the first side of the airfoil section to a first platform side edge, and laterally from the first end at the second side of the airfoil section to a second platform side edge. The internal core cavity extends from the airfoil section into the shelf.

In a further embodiment of any of the foregoing embodiments, the shelf defines a distance from the platform leading edge to the leading end of the airfoil section, and the internal core cavity extends through at least 50% of the distance.

In a further embodiment of any of the foregoing embodiments, the internal core cavity includes a cavity edge that is adjacent at least one of the platform leading edge, the platform trailing edge, the first platform side edge, or the second platform side edge.

In a further embodiment of any of the foregoing embodiments, the cavity edge is adjacent at least the platform leading edge.

In a further embodiment of any of the foregoing embodiments, the cavity edge is over a rail of the platform.

In a further embodiment of any of the foregoing embodiments, the internal core cavity extends continuously in the longitudinal direction from the second end of the airfoil section, and from the first end of the airfoil section turns into the shelf.

In a further embodiment of any of the foregoing embodiments, the internal core cavity in the shelf defines a cavity thickness in the longitudinal direction and a width in a lateral direction between the first side edge and the second side edge, and the width is greater than the thickness.

In a further embodiment of any of the foregoing embodiments, the width is greater than the thickness by a factor of at least 3.

In a further embodiment of any of the foregoing embodiments, the width is greater than the thickness by a factor of no more than 30.

In a further embodiment of any of the foregoing embodiments, the internal core cavity in the shelf extends endlessly around the airfoil section.

The airfoil as recited in claim 1, wherein the internal core cavity in the shelf extends forward from the airfoil section toward the platform leading edge.

In a further embodiment of any of the foregoing embodiments, the internal core cavity in the shelf extends laterally from the airfoil section toward each of the first side edge and the second side edge.

In a further embodiment of any of the foregoing embodiments, at least one of the platform leading edge, the platform trailing edge, the first platform side edge, or the second platform side edge includes a seal slot, the internal core cavity includes a cavity edge that is adjacent to the at least one of the platform leading edge, the platform trailing edge, the first platform side edge, or the second platform side edge that includes the seal slot, and the internal core cavity overlaps the seal slot.

A gas turbine engine according to an example of the present disclosure includes a compressor section, a combustor in fluid communication with the compressor section, and a turbine section in fluid communication with the combustor. The turbine section has a turbine airfoil that includes an airfoil section having an airfoil wall defining leading and trailing ends and first and second sides joining the leading and trailing ends. The first and second sides span in a longitudinal direction between first and second ends. The airfoil wall circumscribes an internal core cavity. A platform from which the airfoil section extends defines a shelf that extends forward from the first end at the leading end of the airfoil section to a platform leading edge, aft from the first end at the trailing end of the airfoil section to a platform trailing edge, and laterally from the first end at the first side of the airfoil section to a first side edge, and laterally from the first end at the second side of the airfoil section to a second side edge. The internal core cavity extends from the airfoil section into the shelf In a further embodiment of any of the foregoing embodiments, the turbine airfoil is adjacent the combustor.

In a further embodiment of any of the foregoing embodiments, the internal core cavity includes a cavity edge that is adjacent at least the platform leading edge.

In a further embodiment of any of the foregoing embodiments, the internal core cavity extends continuously in the longitudinal direction from the second end of the airfoil section, and from the first end of the airfoil section turns into the shelf.

In a further embodiment of any of the foregoing embodiments, the internal core cavity in the shelf defines a cavity thickness in the longitudinal direction and a width in a lateral direction between the first side edge and the second side edge, and the width is greater than the thickness.

In a further embodiment of any of the foregoing embodiments, the width is greater than the thickness by a factor of at least 3.

In a further embodiment of any of the foregoing embodiments, the internal core cavity in the shelf extends endlessly around the airfoil section.

In a further embodiment of any of the foregoing embodiments, the internal core cavity in the shelf extends forward from the airfoil section toward the platform leading edge and extends laterally from the airfoil section toward each of the first side edge and the second side edge.

In a further embodiment of any of the foregoing embodiments, at least one of the platform leading edge, the platform trailing edge, the first platform side edge, or the second platform side edge includes a seal slot, the internal core cavity includes a cavity edge that is adjacent to the at least one of the platform leading edge, the platform trailing edge, the first platform side edge, or the second platform side edge that includes the seal slot, and the internal core cavity overlaps the seal slot.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
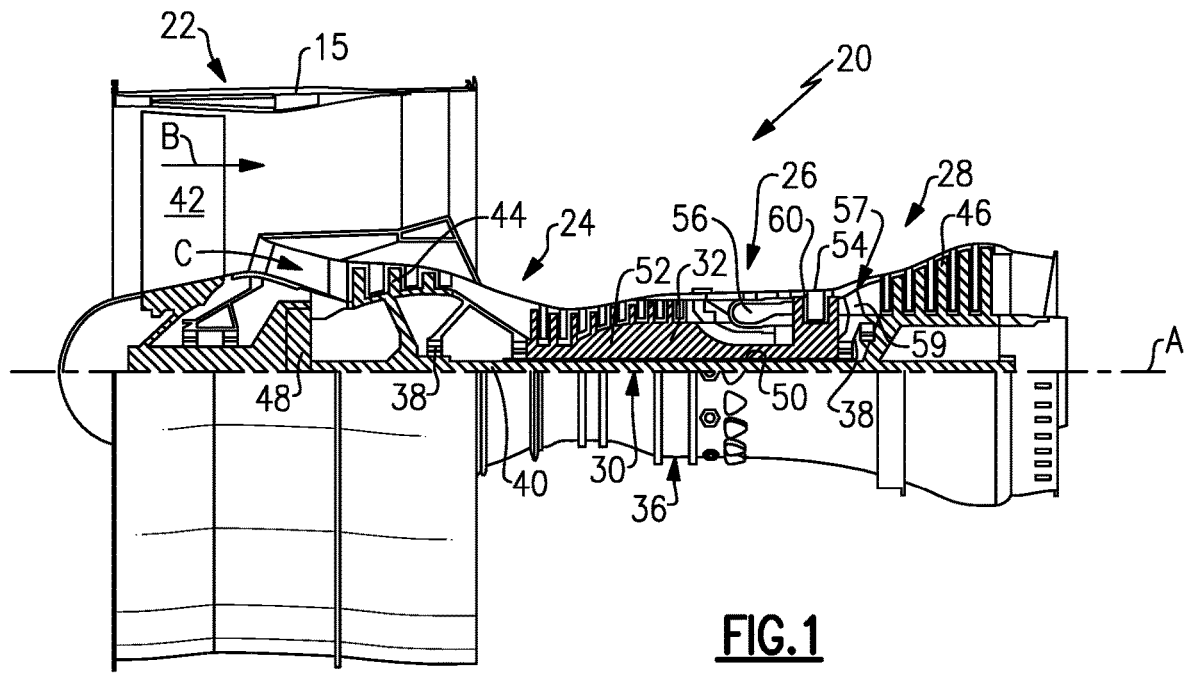
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
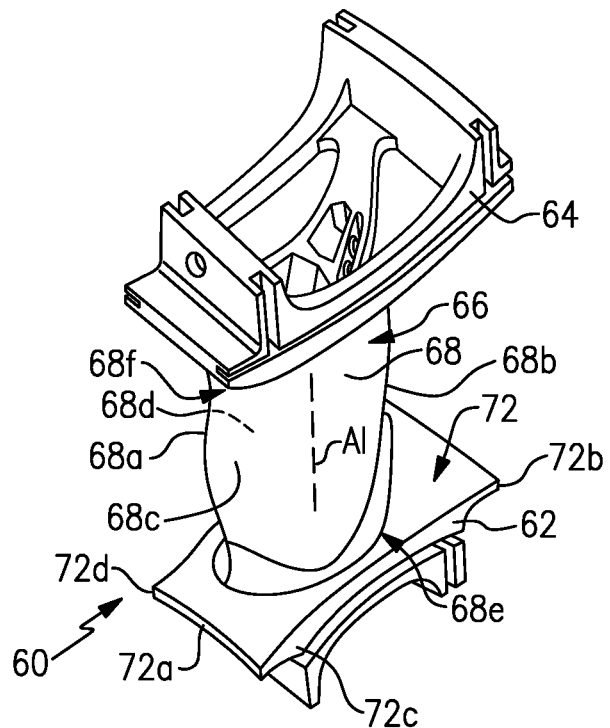
FIG. 2 illustrates an airfoil of the engine of FIG. 1.

FIG. 2 illustrates a representative example of a turbine airfoil 60 used in the turbine engine 20 (see also FIG. 1). As shown, the turbine airfoil 60 is a turbine vane in the high pressure turbine 54 that is adjacent the combustor 56; however, it is to be understood that, although the examples herein may be described with reference to the turbine vane, this disclosure is also applicable to turbine blades and turbine vanes in other locations.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

Figure 3:
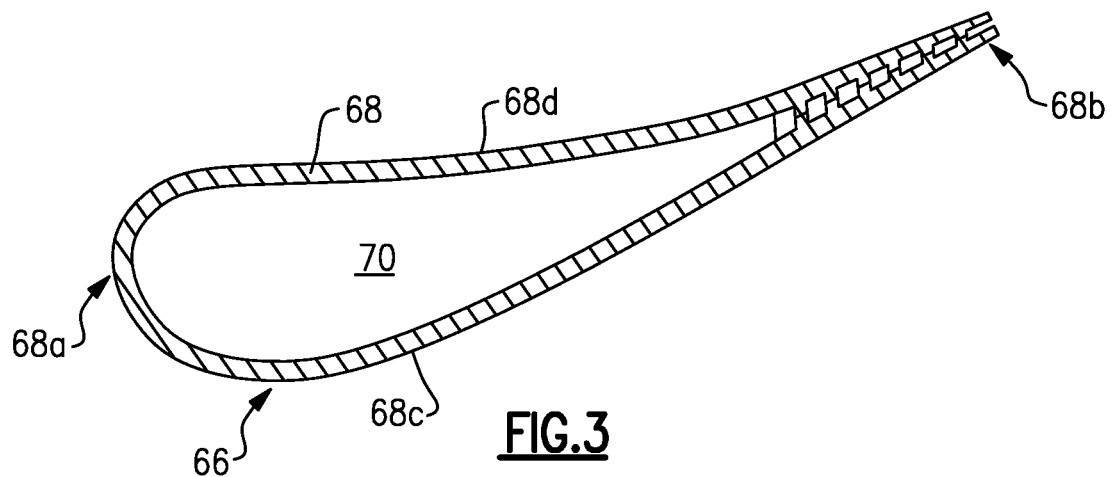
FIG. 3 illustrates a sectioned view of the airfoil of FIG. 3.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. Cooling air may be bled from the compressor section 24 and fed into the internal core cavity 70 to cooling the airfoil section 66.

Referring again to FIG. 2, the first platform 62 defines a shelf 72. The shelf 72 generally extends outwards from the base of the airfoil section 66 at the first end 68e. The shelf 72 extends forward from the first end 68e at the leading end 68a of the airfoil section 66 to a platform leading edge 72a, aft from the first end 68e at the trailing end 68b of the airfoil section 66 to a platform trailing edge 72b, laterally from the first end 68e at the first side 68c of the airfoil section 66 to a first platform side edge 72c, and laterally from the first end 68e at the second side 68d of the airfoil section 66 to a second platform side edge 72d. It is to be understood that the second platform 64 may have different aerodynamic contours than the first platform 62 but has substantially the same type of features as the first platform 62. Moreover, although the examples herein may be described with reference to the first platform 62, it is to be appreciated that the examples are also applicable to the second platform 64.

In a typical airfoil, there may be cooling passages or a cavity within the airfoil section and draws cooling air through the platforms. As such, the cavity or airfoil cooling passage extends radially through the platforms and does not extend to the platform edges. As a result, such radial cooling passages or cavities for delivering air to the airfoil section do not extend to the platform edges at the base of the airfoil, thereby resulting in areas at the platform edges being uncooled.

Figure 4:
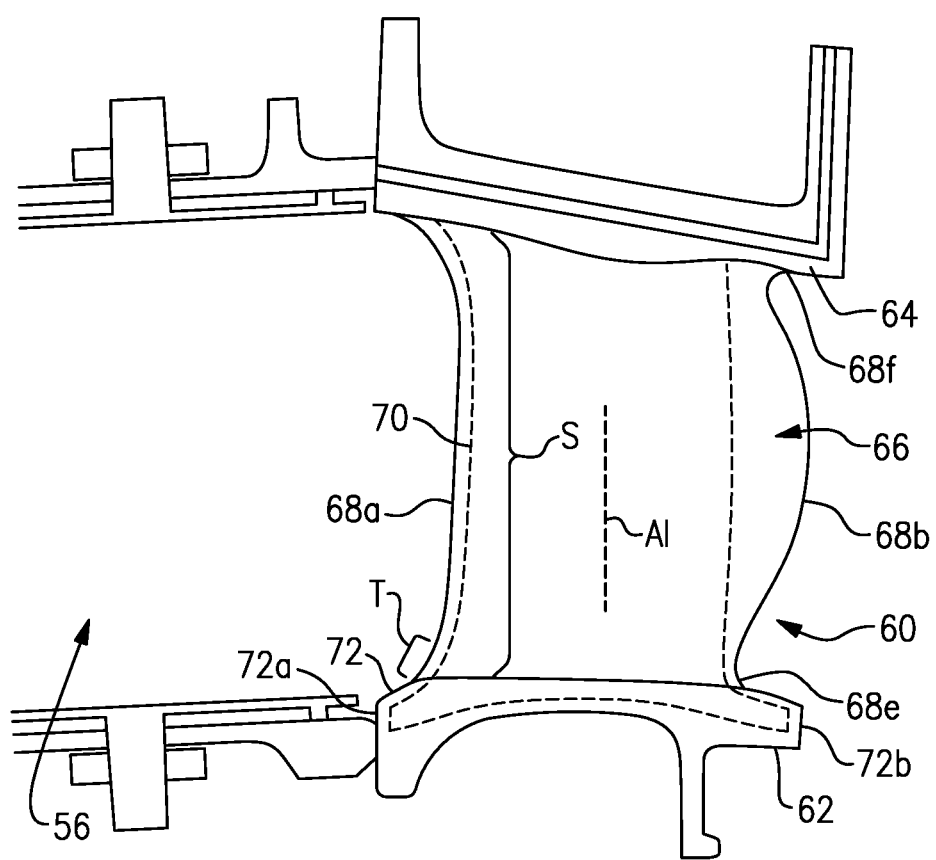
FIG. 4 illustrates is a side view of the airfoil of FIG. 2 adjacent a combustor.

In contrast, as depicted in FIG. 4, the internal core cavity 70 of the airfoil 60 extends from the airfoil section 66 into the shelf 72 of the first platform 62 to provide cooling to the first platform 62, particularly near one or more of the platform edges 72a/72b/72c/72d. For example, the internal core cavity 70 extends continuously over span S in the longitudinal direction A1 from the second end 68f of the airfoil section 66 to the first end 68e of the airfoil section 66. The internal core cavity 70 then turns at region T from the first end 68e of the airfoil section 66 into the shelf 72. As an example, the internal core cavity 70 is a "complementary" cavity and thus follows the exterior profile of the airfoil section 66 and shelf 72, as opposed to a "non-complementary" or independent cavity that is formed by other structures and does not substantially follow the exterior profile.

Figure 5:
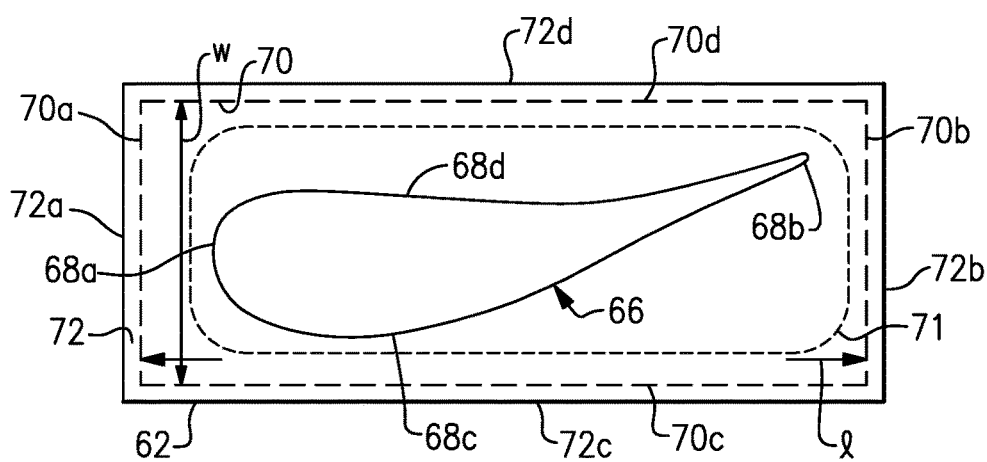
FIG. 5 illustrates selected portions of an airfoil to demonstrate an expanse of a core cavity in a shelf of a platform.

FIG. 5 depicts the expanse of the internal core cavity 70 in the shelf 72 of the first platform 62. In this example, the internal core cavity 70 in the shelf 72 extends forward from the leading end 68a of the airfoil section 66 toward the platform leading edge 72a, aft from the trailing end 68b toward the platform trailing edge 72b, laterally from the first side 68c toward the first platform side edge 72c, and laterally from the second side 68d toward the second platform side edge 72d.

In this example, the internal core cavity 70 includes a leading cavity edge 70a adjacent the platform leading edge 72a, a trailing cavity edge 70b adjacent the platform trailing edge 72b, a first cavity side edge 70c adjacent the first platform side edge 72c, and a second cavity side edge 70d adjacent the second platform side edge 72d. That is, the internal core cavity 70 in this example extends in the shelf 72 up to each of the platform edges 72a/72b/72c/72d.

As also shown in FIG. 5, the internal core cavity 70 in the shelf 72 extends endlessly around the airfoil section 66. For instance, the internal core cavity 70 provides a continuous passage, represented at 71, around the airfoil section 66, to provide cooling entirely around the shelf 72 of the platform 62.

Figure 6:
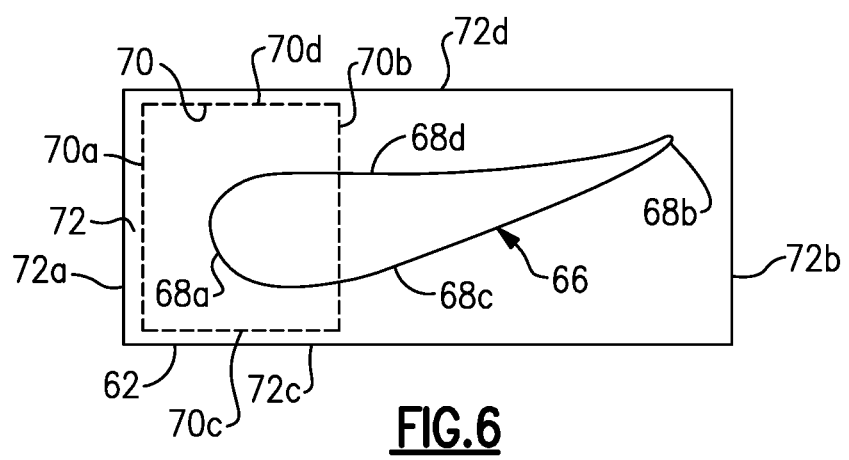
FIG. 6 illustrates selected portions of an airfoil to demonstrate another example of an expanse of a core cavity in a shelf of a platform.

Alternatively, if cooling is not required at one or more of the platform edges 72a/72b/72c/72d or only at portions of the platform edges 72a/72b/72c/72d, the internal core cavity 70 may extend in the shelf 72 up to fewer than all of the platform edges 72a/72b/72c/72d and/or up to only portions of the platform edges 72a/72b/72c/72d. For example, as shown in FIG. 6, the internal core cavity 70 in the shelf 72 extends forward from the leading end 68a of the airfoil section 66 to the cavity leading edge 70a at the platform leading edge 72a but only extends laterally over a forward portion of the shelf 72 and does not extend in the aft direction from the trailing end 68b of the airfoil section 66.

Figure 7:
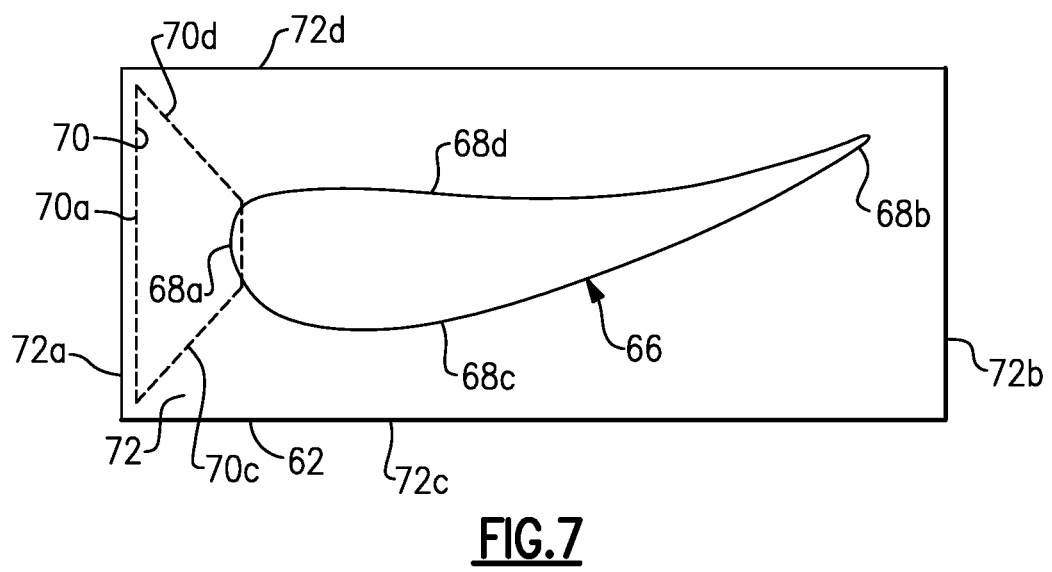
FIG. 7 illustrates selected portions of an airfoil to demonstrate another example of an expanse of a core cavity in a shelf of a platform.

In another example depicted in FIG. 7, the internal core cavity 70 in the shelf 72 extends forward from the leading end 68a of the airfoil section 66 to the cavity leading edge 70a at the platform leading edge 72a but does not extend in the lateral direction to the platform side edges 72c/72d or in the aft direction to the platform trailing edge 72b.

As mentioned above, the airfoil 60 may be adjacent the combustor 56. This is shown in FIG. 4 and also in a magnified sectioned view in FIG. 8. At such a close proximity next to the combustor 56, the airfoil 60 is exposed to combustion gas that is at a temperature that is higher than at downstream positions in the turbine section 28. The extension of the internal core cavity 70 into the platform 62 (and/or platform 64) facilitates cooling of the platform 62 in such conditions. The cooling scheme provided by the internal core cavity 70 in the shelf 72 may not be needed in downstream airfoils. For example, only the initial stage of vanes in the high pressure turbine 54 may employ the internal core cavity 70 in the shelf 72, while vanes in downstream stages exclude the cavity 70 in the shelf 72.

Figure 8:
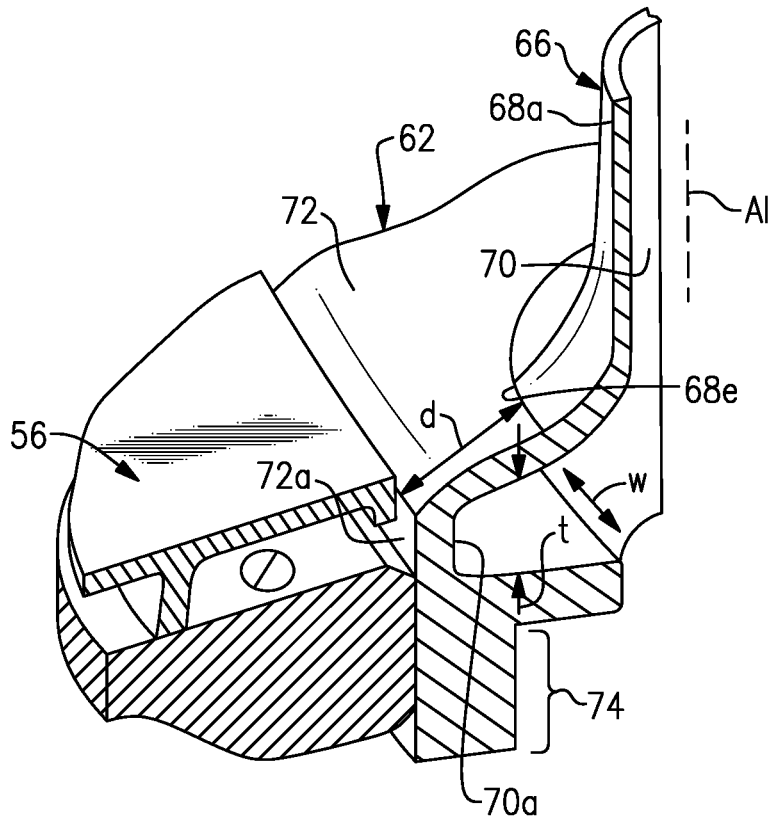
FIG. 8 illustrates a sectioned magnified view of a portion of an airfoil adjacent a portion of a combustor.

In a further example, depicted in FIG. 8, the forward cavity edge 70a of the internal core cavity 70 extends up to the platform leading edge 72a. For instance, the degree of extension up to the platform leading edge 72a may be explained with reference to a distance (d) from the platform leading edge 72a to the leading end 68a of the airfoil section 66 at the first end 68e thereof. The distance (d) is a linear distance and is also the shortest linear distance from the platform leading edge 72a to the leading end 68a of the airfoil section 66. The internal core cavity 70 extends through at least 50% of the distance (d). That is, the internal core cavity 70 extends through more than half of the length of the shelf 72 that is between the platform leading edge 72a and the leading end 68 of the airfoil section 66. The remaining distance, from the leading cavity edge 70a to the platform leading edge 72a, is solid. In a further example, the internal core cavity 70 extends through at least 70% of the distance (d) or through at least 85% of the distance (d). Likewise, distances can be determined from the other edges 72b/72c/72d to, respectively, the trailing end 68b, first side 68c, and second side 68d, and the internal core cavity 70 may extend through at least 50%, 70%, or 85% of each of those distances.

The platform 62 may also have a rail 74. For example, the rail 74 is a ledge or flange that projects radially inwards from the shelf 72 at the platform leading edge 72a. The rail 74 may be flush with the platform leading edge 72a and may extend fully or partially around the platform 62 such that the rail 74 is also present under one or more of the platform edges 72b/72c/72d. In particular, the rail 74 is a solid region in the airfoil 60 that can be challenging to cool, especially if adjacent the combustor 56. In this regard, the internal core cavity 70 in the shelf 72 extends over the rail 74 to thereby provide cooling thereto. For example, the forward cavity edge 70a is over (aligned radially) the rail 74. Likewise, if the rail 74 is present under one or more of the platform edges 72b/72c/72d, the internal core cavity 70 may also extend over the rail 74 at those locations.

The internal core cavity 70 in the shelf 72 may also differ from a channel, which is typically long and narrow. For instance, the internal core cavity 70 is relatively thin, like a channel, but is wider than a channel. As an example, the internal core cavity 70 in the shelf 72 defines a cavity thickness (t) in the longitudinal direction A1 and a width (w) (see also FIG. 5) in a lateral direction between the first platform side edge 72c and the second platform side edge 72d. The width (w) is greater than the thickness (t). More typically, however, the width (w) will be greater than the thickness (t) by a factor of at least 3. Additionally, the width (w) may typically also be greater than the thickness (t) by a factor of no more than 30. Similarly, a length (l) could be taken in the direction between the platform leading edge 72a and the platform trailing edge 72b, and the length (l) may be greater than the thickness (t) by a factor of at least 3.

Figure 9:
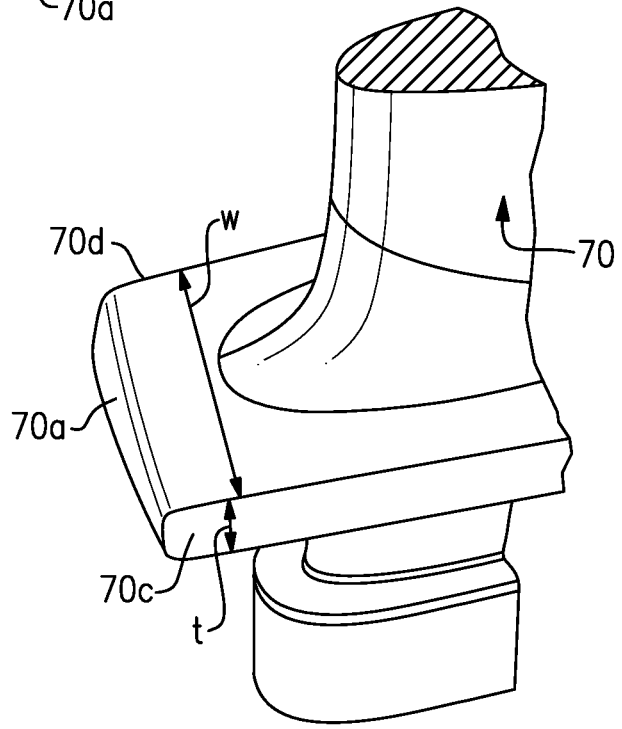
FIG. 9 illustrates an "inverse" or negative view of an internal core cavity.

FIG. 9 shows an "inverse" or negative view of a portion of the internal core cavity 70. The inverse view is also representative of an investment core that may be used in an investment casting process to form the internal core cavity 70 in the airfoil 60. Most typically, the investment casting core is injection molded from a material that contains ceramic or metal alloy. The investment core is shaped to form the internal core cavity 70. In the inverse view, solid structures of the investment core produce void structures in the airfoil 60 and void structures of the investment core produce solid structures in the airfoil 60. Thus, the investment core has the negative of the structural features of the internal core cavity 70. It is to be understood that although the inverse view presented here to show an example of the internal core cavity 70, the negative view also represents an investment core and a corresponding cavity in a molding tool that is operable to mold the investment core.

Figure 10:
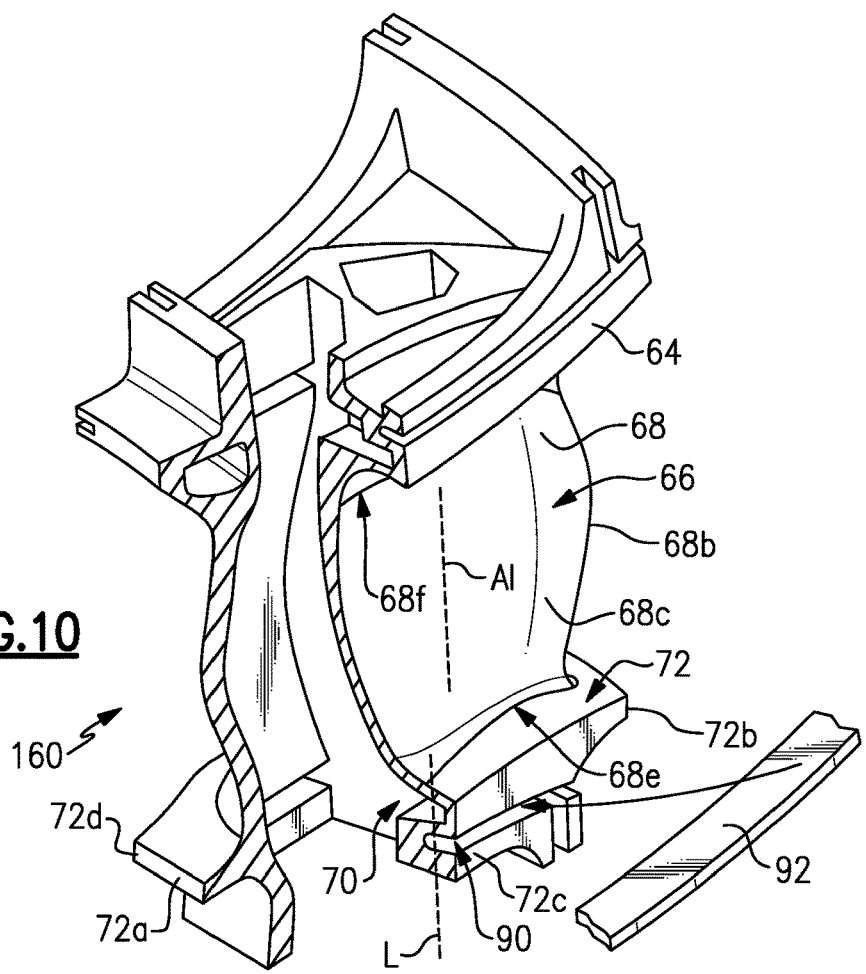
FIG. 10 illustrates a partial cutaway view of another example airfoil that has a seal slot.

FIG. 10 illustrates another example airfoil 160. In this disclosure, like reference numerals designate like elements where appropriate and reference numerals with the addition of one-hundred or multiples thereof designate modified elements that are understood to incorporate the same features and benefits of the corresponding elements. In this example, the shelf 72 includes a seal slot 90. As shown, the seal slot 90 is in the first platform side edge 72c. It is to be appreciated, however, that the platform leading edge 72a, platform trailing edge 72b, and/or second platform side edge 72d may alternatively or additionally have seal slot 90.

Figure 11:
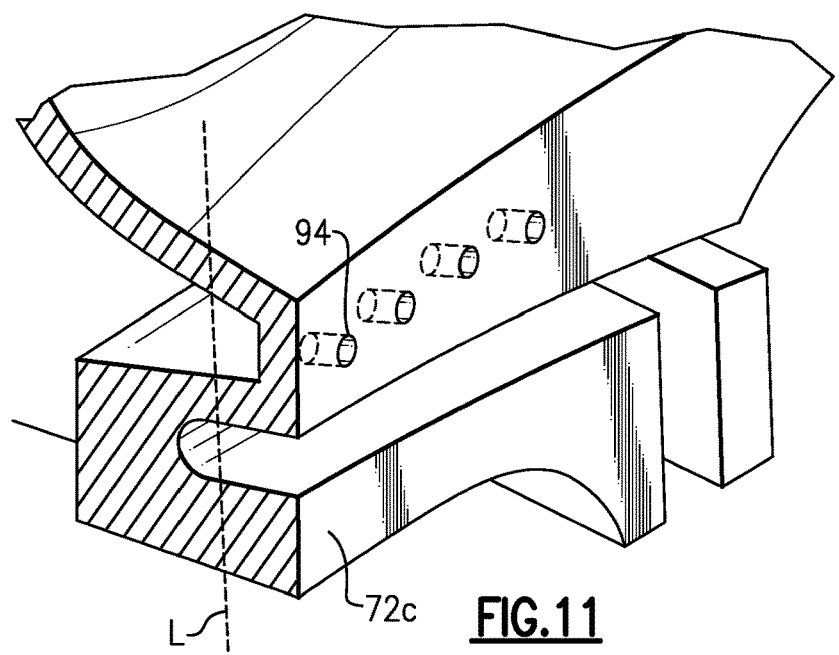
FIG. 11 illustrates a magnified view of a portion of the seal slot of FIG. 10.

The internal core cavity 70 in the shelf 72 extends adjacent the seal slot 90. For example, the internal core cavity 70 and the seal slot overlap. As shown in the magnified view in FIG. 11, the overlap is evident in that a line L that is parallel to the longitudinal direction A1 intersects both the internal core cavity 70 and the seal slot 90.

The seal slot 90 serves to receive a feather seal 92. The feather seal 92 seal the gap between adjacent airfoils 160 in the engine 20. In particular, the first and second platform side edges 72c/72d, also known as matefaces, the feather seal 92, and the vicinity proximate the matefaces heat up during engine operation. The presence of the internal core cavity 70 in the shelf 72 at the first and second platform side edges 72c/72d facilitates cooling the matefaces and feather seal 92. For instance, the portion of the internal core cavity 70 in the shelf 72 that overlaps with the seal slot 90 is located between the seal slot 90 and the core gaspath side surface of the platform 62. As the gaspath side surface heats up, the internal core cavity 70 can remove heat prior to heat transfer reaching the seal slot 90 and feather seal 92. The internal core cavity 70 in the shelf 72 thereby serves as a barrier or insulator for the seal slot 90 and feather seal 92. Additionally, the presence of the internal core cavity 70 in the shelf adjacent the seal slot 90 reduces the mass of solid material that would otherwise be present, thereby further facilitating cooling.

The size of the portion of the internal core cavity 70 in the shelf 72 that overlaps with the seal slot 90 may also be configured to enable cooling holes 94 in the platform 62. For instance, the portion of the internal core cavity 70 that overlaps may have a minimum size that is selected in accordance with the size of the cooling holes 94. As an example, the thickness of the portion of the internal core cavity 70 in the shelf 72 that overlaps is greater than the diameter of the cooling holes 94. This enables the cooling holes 94 to open fully into the internal core cavity 70 without interfering with the surrounding structures or seal slot 90 and also enables the cooling holes 94 to be drilled or otherwise formed without damaging the seal slot 90 or surrounding structures.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining leading and trailing ends and first and second sides joining the leading and trailing ends, the first and second sides spanning in a longitudinal direction between first and second ends, the airfoil wall circumscribing an internal core cavity;
a platform from which the airfoil section extends, the platform defining a shelf that extends forward from the first end at the leading end of the airfoil section to a platform leading edge, aft from the first end at the trailing end of the airfoil section to a platform trailing edge, laterally from the first end at the first side of the airfoil section to a first platform side edge, and laterally from the first end at the second side of the airfoil section to a second platform side edge, the internal core cavity extending from the airfoil section into the shelf, the internal core cavity in the shelf having a trailing cavity edge that is closer to the forward end than to the trailing end, the internal core cavity defining a cavity thickness in the longitudinal direction and a width in a lateral direction between the first side edge and the second side edge, the width is greater than the thickness by a factor of at least 3 and no more than a factor of 30.

2. The airfoil as recited in claim 1, wherein the shelf defines a distance from the platform leading edge to the leading end of the airfoil section, and the internal core cavity extends through at least 50% of the distance.

3. The airfoil as recited in claim 1, wherein the internal core cavity extends continuously in the longitudinal direction from the second end of the airfoil section, and from the first end of the airfoil section turns into the shelf.

4. The airfoil as recited in claim 1, wherein the internal core cavity in the shelf extends forward from the airfoil section toward the platform leading edge.

5. The airfoil as recited in claim 1, wherein the internal core cavity in the shelf extends laterally from the airfoil section toward each of the first side edge and the second side edge.

6. The airfoil as recited in claim 1, wherein the internal core cavity in the shelf extends forward from the airfoil section toward the platform leading edge and extends laterally from the airfoil section toward each of the first side edge and the second side edge.

7. The airfoil as recited in claim 1, wherein the internal core cavity in the shelf extends forward from the airfoil section toward the platform leading edge and does not extend laterally from the airfoil section to the first side edge and the second side edge.

8. The airfoil as recited in claim 1, wherein the internal core cavity in the shelf defines a cavity width in a lateral direction between the first side edge and the second side edge, and the cavity width is divergent going from the airfoil section toward the platform leading edge.

9. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining leading and trailing ends and first and second sides joining the leading and trailing ends, the first and second sides spanning in a longitudinal direction between first and second ends, the airfoil wall circumscribing an internal core cavity;
a platform from which the airfoil section extends, the platform defining a shelf that extends forward from the first end at the leading end of the airfoil section to a platform leading edge, aft from the first end at the trailing end of the airfoil section to a platform trailing edge, laterally from the first end at the first side of the airfoil section to a first side edge, and laterally from the first end at the second side of the airfoil section to a second side edge, the internal core cavity extending from the airfoil section into the shelf, the internal core cavity in the shelf having a trailing cavity edge that is closer to the leading end than to the trailing end the internal core cavity defining a cavity thickness in the longitudinal direction and a width in a lateral direction between the first side edge and the second side edge, the width is greater than the thickness by a factor of at least 3 and no more than a factor of 30.

10. The gas turbine engine as recited in claim 9, wherein the turbine airfoil is adjacent the combustor.

11. The gas turbine engine as recited in claim 9, wherein the internal core cavity includes a cavity edge that is adjacent at least the platform leading edge.

12. The gas turbine engine as recited in claim 9, wherein the internal core cavity extends continuously in the longitudinal direction from the second end of the airfoil section, and from the first end of the airfoil section turns into the shelf.

13. The gas turbine engine as recited in claim 9, wherein the internal core cavity in the shelf extends forward from the airfoil section toward the platform leading edge and extends laterally from the airfoil section toward each of the first side edge and the second side edge.

* * * * *